United States Patent
Lobo et al.

(10) Patent No.: US 10,933,606 B2
(45) Date of Patent: Mar. 2, 2021

(54) FLEXIBLE COMPOSITE MATERIAL, METHOD OF OBTENTION AND USES THEREOF

(71) Applicant: TMG—TECIDOS PLASTIFICADOS E OUTROS REVESTIMENTOS PARA A INDÚSTRIA AUTOMÓVEL, SA, São Cosme Vale (PT)

(72) Inventors: Irene Lobo, Braga (PT); Elizabete Pinho, Oporto (PT)

(73) Assignee: TMG—TECIDOS PLASTIFICADOS E OUTROS REVESTIMENTOS, São Cosme Vale (PT)

( * ) Notice: Subject to any disclaimer, the term of this patent is extended or adjusted under 35 U.S.C. 154(b) by 115 days.

(21) Appl. No.: 15/735,857

(22) PCT Filed: Jun. 16, 2016

(86) PCT No.: PCT/IB2016/053568
§ 371 (c)(1),
(2) Date: Dec. 12, 2017

(87) PCT Pub. No.: WO2016/203417
PCT Pub. Date: Dec. 22, 2016

(65) Prior Publication Data
US 2018/0162089 A1 Jun. 14, 2018

(30) Foreign Application Priority Data

Jun. 16, 2015 (PT) .......................................... 108557
Oct. 26, 2015 (EP) ...................................... 15191544

(51) Int. Cl.
*B32B 3/26* (2006.01)
*B32B 5/02* (2006.01)
(Continued)

(52) U.S. Cl.
CPC .............. *B32B 3/263* (2013.01); *B32B 5/022* (2013.01); *B32B 5/024* (2013.01); *B32B 5/026* (2013.01);
(Continued)

(58) Field of Classification Search
CPC ..................................................... B32B 27/40
See application file for complete search history.

(56) References Cited

U.S. PATENT DOCUMENTS 4,018,954 A * 4/1977 Fukushima ............... B32B 5/24
428/86
4,349,597 A * 9/1982 Fine .......................... B32B 5/24
428/95

(Continued)

FOREIGN PATENT DOCUMENTS

CN 103437193 B 8/2015
DE 10 2004 059773 A1 6/2006
(Continued)

OTHER PUBLICATIONS

Schultze—EP 0800916B1—MT—co-extruded films w-aliphatic & aromatic TPU+thicknesses—1997 (Year: 1997).*
(Continued)

*Primary Examiner* — Callie E Shosho
*Assistant Examiner* — John Vincent Lawler
(74) *Attorney, Agent, or Firm* — Leason Ellis LLP

(57) ABSTRACT

Flexible composite material, method of obtention and uses thereof The present description refers to a flexible composite material, method of obtention and uses thereof with a surprising resistance to tear, fissure and/or breaking of the material in conditions of extreme use, namely presence of oils and low temperatures, particularly a flexible composite material comprising the following layers: a support layer selected from the following list: fabric, nonwoven fabric,
(Continued)

foam knitted fabric, or mixtures thereof; an intermediate layer of polyvinyl chloride, PVC, containing a plurality of sublayers; a compact layer of thermoplastic polyurethane, TPU, containing a plurality of sublayers; wherein the TPU compact layer comprises: 0.4-70% w/w of an aromatic TPU; 0.2-35% w/w of an aliphatic TPU; The present material can be used in the production of upholsteries, namely upholsteries for the automobile industry, in particular automobile seats.

16 Claims, 2 Drawing Sheets

(51) Int. Cl.
  *B32B 27/06* (2006.01)
  *B32B 27/08* (2006.01)
  *B32B 27/12* (2006.01)
  *B32B 27/30* (2006.01)
  *B32B 27/40* (2006.01)
  *D06N 3/14* (2006.01)
  *B32B 5/18* (2006.01)

(52) U.S. Cl.
  CPC .............. *B32B 5/18* (2013.01); *B32B 27/065* (2013.01); *B32B 27/08* (2013.01); *B32B 27/12* (2013.01); *B32B 27/304* (2013.01); *B32B 27/40* (2013.01); *D06N 3/141* (2013.01); *B32B 2250/05* (2013.01); *B32B 2255/10* (2013.01); *B32B 2255/26* (2013.01); *B32B 2601/00* (2013.01)

(56) References Cited

U.S. PATENT DOCUMENTS

| | | | | |
|---|---|---|---|---|
| 4,614,671 | A * | 9/1986 | Wong | D06N 3/0002 427/245 |
| 5,156,900 | A * | 10/1992 | Nishimura | D06N 3/14 427/245 |
| 6,599,597 | B1 * | 7/2003 | Bonk | B29C 49/0005 428/36.6 |
| 6,852,418 | B1 | 2/2005 | Zurbig et al. | |
| 2001/0028957 | A1 * | 10/2001 | Breuksch | B32B 27/40 428/423.1 |
| 2007/0218791 | A1 * | 9/2007 | Lee | B32B 7/14 442/59 |
| 2011/0244746 | A1 * | 10/2011 | Dobin | D06N 3/0015 442/181 |
| 2015/0133014 | A1 * | 5/2015 | Traser | C08G 18/6637 442/64 |

FOREIGN PATENT DOCUMENTS

| | | | | |
|---|---|---|---|---|
| DE | 102004059773 | A1 * | 6/2006 | ....... B29C 45/14811 |
| DE | 10 2013 003446 | A1 | 8/2014 | |
| DE | 102013003446 | A1 * | 8/2014 | ............. B32B 3/30 |
| EP | 0800916 | A2 * | 10/1997 | ............. B32B 27/40 |
| PT | 107725 | A | 10/2014 | |

OTHER PUBLICATIONS

Gerken—DE 10-2004-059773 A1—ISR D#4—MT—textile+plastic+ motivation aliphatic surface +impressed graining-foam+lacquer— 2006 (Year: 2006).*

Huntington et al. ("Distortion of interfaces in a multilayer polymer co-extrusion feedblock," International Polymer Processing XXVIII, published 2013 (Year: 2013).*

Schaeffer Philipp—DE 10-2013-003446 A1—ISR D#2—MT— composite w-polyurethane dispersion+PVC layer+support—2014 (Year: 2014).*

Huntsman, "A guide to thermoplastic polyurethanes (TPU)" retrieved from http://www.huntsman.com/portal/page/portal/ polyurethanes/ Media%20Library/global/files/ guide_tpu.pdf on Jul. 27, 2015. (2013).

* cited by examiner

|  | Upholstery in PVC | Upholstery in PUR | flexible composite material described |
|---|---|---|---|
| Fragility to impact 15 min at -40°C |  |  |  |
| Fatigue strength 80000 cycles at -10°C 30 cycles/min 2% of tension |  |  |  |
| Tensile strength through the VDA 230-225 method after 72h at 40°C and 1000 cycles at -20°C |  |  | ** |
| Gakushin friction over seams 2000 cycles, 2400g of weight |  |  |  |
| Volatility/loss of weight (% mass lost) 100 h at 120 °C | 2.14% | 2.71 | 0.94% |

**even after 50000 cycles.

Fig. 2

FLEXIBLE COMPOSITE MATERIAL, METHOD OF OBTENTION AND USES THEREOF

CROSS-REFERENCE TO RELATED APPLICATIONS

This application is a U.S. National Stage Application under 35 U.S.C. § 371 of International Patent Application No. PCT/IB2016/053568, filed Jun. 16, 2016 which claims priority to European Patent Application No. 15191544.4, filed Oct. 26, 2015 and Portugal Patent Application No.: 108557, filed Jun. 16, 2015, which are hereby incorporated by reference in their respective entireties.

TECHNICAL FIELD

The present description refers to a flexible composite material, method of obtention and uses thereof.

The present material can be used in the production of upholsteries, namely upholsteries for the automobile industry, in particular automobile seats.

BACKGROUND

Traditionally, upholsteries, in particular of the automobile industry, use natural leather as it is associated to a higher performance at the level of mechanical properties namely flexural strength, chemical resistance such as resistance to grease, sun screen and its constituents. For these reasons, it is considered a material of election for upholsteries, but presents a high price.

Alternatively, the market of PVC applied to upholsteries, namely to those of the interior of the automobile has increased, both due to the optimization of the formulations, and due to its versatility, in particular greater versatility in terms of aesthetic effects, such as 3D superficial patterns and due to its reduced cost. This fact has promoted the use of PVC in applications which are traditionally in natural leather. Such is the case of its use for the sitting area of automobile upholsteries, where its application in substitution of natural leather is still a technical challenge.

The upholsteries, namely the seats for automobiles, are exposed to multiple factors that affect the quality/maintenance of the material used, such as:
  Abrasion due to the entrance/exit of passengers of the vehicle;
  Contact with passenger sweat, hands, body lotion, perfume, cosmetics;
  Accidental spilling of diverse products;
  Exposure to external environmental factors, such as different humidity conditions, temperature, light;
  And also cleaning products and procedures.

Therefore, use can lead to wear and tear of these materials and their serious degradation, leading to the replacement of the material and/or to complaints by clients, particularly due to rupture, fissure, abrasion, fading, deformation and/or surface wear and tear.

These phenomena occur essentially due to the migration of substances of the diverse layers of the material and/or through extraction of external agents (namely grease or detergents) or due to entrance of substances into the material which were not present. They are therefore bidirectional phenomena of diffusion.

These facts are described in order to illustrate the technical problem solved by the embodiments of the present document.

GENERAL DESCRIPTION

To solve these problems, a new flexible composite material was developed, for vehicle upholsteries, wherein the proposed structure and combination of materials presents greater resistance to fissure throughout time, with high rates of flexure and also resistance to chemical attack even after being laboratorially subjected to diverse cycles of degradation, preserving resistance characteristics even after contact with oils, grease, namely in contact with human skin, even though subjected to different thermal amplitudes.

The material described in the present disclosure presents a compact structure of thermoplastic polyurethane (TPU) with polyvinyl chloride (PVC) in sublayers, wherein the combination of different TPUs allows the TPU layer to function as a barrier layer, both for the passage of plasticizers, and for the entrance of fluids alien to the material, thereby allowing for the increase in the quality of the material and the duration of the product with the desired quality, even after the submission of the product to diverse cycles of flexure degradation under extreme extraction and temperature conditions.

One of the aspects of the present disclosure is related to a flexible composite material comprising the following layers:
  a support layer selected from the following list: fabric, nonwoven fabric, knitted fabric, foam, or mixtures thereof;
  an intermediate layer of polyvinyl chloride (PVC) containing a plurality of sublayers;
  a compact thermoplastic polyurethane (TPU) layer containing a plurality of sublayers;
  wherein the TPU compact layer comprises:
  0.4-70% w/w of an aromatic TPU, preferably 30-66% w/w;
  0.2-35% w/w of an aliphatic TPU, preferably 15-33% w/w.

In an embodiment of the flexible composite material, the TPU sublayer, of the TPU compact layer, in contact with the PVC layer can comprise 100% w/w of an aliphatic TPU.

In another embodiment of the flexible composite material, wherein the TPU sublayer, of the TPU compact layer, in contact with the layer of PVC can be an aliphatic TPU.

In another embodiment of the flexible composite material, wherein the TPU compact layer is extruded.

In another embodiment of the flexible composite material, wherein the PVC intermediate layer is obtainable through coating.

In another embodiment of the flexible composite material, wherein the aliphatic TPU can be selected from a list consisting of: TPU comprising polyols and isocyanates, in particular hexamethylene diisocyanate (HDI), isophorone diisocyanate (IPDI), 2-methylphenthane diisocyanate (MPDI), 2,4,4-trimethyl-hexamethylenediisocyanate (TMDI), norbornane (NBDI), isophorone diisocyanate (IPDI); dicyclohexylmethane diisocyanate (HMDI), meta-tetramethylene diisocyanate (TMXDI), 1,4-cyclohexane diisocyanate (CHDI), or mixtures thereof, among others.

In another embodiment of the flexible composite material, wherein the aromatic TPU can be selected from a list consisting of 4,4'-diphenyl methane diisocyanate (MDI), diisocyanatemethylbenzene, toluene diisocyanate (TDI) and its isomers, 1.5-naphthalene diisocyanate (NDI), p-phenylene diisocyanate (PPDI); or mixtures thereof, among others.

In another embodiment of the flexible composite material, wherein the thickness of the PVC layer is of 50-1000 µm, preferably 200-650 µm.

In another embodiment of the flexible composite material, wherein the thickness of the TPU layer is between 20-1000 µm, preferably 150-500 µm.

In another embodiment of the flexible composite material, wherein the TPU layer comprises between 1-5 sublayers, preferably 2-3 sublayers.

In another embodiment of the flexible composite material, further comprising an external layer of lacquer connected to the TPU, in particular the layer of lacquer is connected to an aliphatic TPU. The layer of lacquer or mixture of lacquers is a protective surface layer, in order to improve the intended superficial properties, namely regarding touch, chemical resistance, resistance to scratch and abrasion, aesthetical effect, among other properties.

In another embodiment of the flexible composite material, further comprising a layer of lacquer or mixtures of lacquer, or several sublayers of lacquers or mixtures of lacquers namely 1, 2, 3 or 4 sublayers of lacquer coating the TPU compact layer.

In another embodiment of the composite flexible material, the material can further comprise another layer of lacquer or mixtures of lacquers which connect to a sublayer—of the TPU compact layer—of aliphatic TPU.

In another embodiment of the flexible composite material, wherein the lacquer is selected from a solvent or aqueous base lacquer—or lacquers list: polyurethane, acrylic, vinyl acrylic, polyamides, reticulated by isocyanate, polycarbodiimide or by ultraviolet radiation by resorting, namely, to acrylate and photoinitiators, or mixtures thereof.

In another embodiment of the flexible composite material, wherein the layers of TPU and/or PVC can further comprise pigment, additive, stabilizer, filler, plasticizer, blowing agents, expansion reaction catalyst (kicker), or mixtures thereof.

In another embodiment, the flexible composite material may also contain additional components whose addition does not damage the barrier effect to the migration of additives of the intended lower PVC layer, such as polyolefins (eg.: Polyethylene and polypropylene), compatibilizers (eg.: ethylene thermopolymers and graffited copolymers), fillers (eg.: calcium carbonate, silicates, barium sulphate), stabilizers (eg.: phenolics, phosphites and hydroxylamines), antistatics (eg.:, permanents, such as polyamide and polyeter or migration copolymers, such as hydrophylic/lipophylic), among others or mixtures thereof.

In another embodiment of the flexible composite material, each of the layers can comprise the following thickness:
the textile support layer between 300-2000 µm, preferably 400-600 µm;
the PVC layer between 50-1000 µm, preferably 200-650 µm;
the TPU compact layer between 20-1000 µm, preferably 150-500 µm;
the layer of lacquer or lacquers between 1-100 µm, preferably 10-15 µm.

Another aspect of the present disclosure is related with upholsteries, in particular with upholsteries for the automobile industry comprising one of the flexible composite materials described in the present document.

Another aspect of the present disclosure is related to the seat for automobiles comprising one of the flexible composite materials described in the present document.

Another aspect of the present disclosure is related to a process for the obtention of the flexible composite material described in the present document comprising the following steps:
obtention of an PVC intermediate layer through coating or enduction of the PVC intermediate layer and a support layer;
extrusion of a TPU compact layer with simultaneous gluing of the material obtained in the previous step.

As we can see, the material is obtained without the need to resort to adhesives, being that when the material is obtained in this manner there is an integration between the TPU and PVC layer, increasing even more the resistance to tear, fissure and maintaining the elastic properties of the material.

Another embodiment of the process can still include the lacquer of the product obtained in the previous step through rotogravure, in particular with solvent—and/or aqueous-base polymers, aqueous dispersions, PUR solvent base lacquers.

Another embodiment of the process can further comprise the engraving of the material with a predefined texture/image.

The flexible composite material for upholsteries described in this document is a hybrid material with multiple layers/sublayers. The manufacturing process allows for the obtention of a structure with a top layer—TPU layer—comprising a hybrid polymer mixture which functions as a barrier both for exterior oils which try to enter the interior of the material and to prevent the loss of plasticizers through the PVC intermediate layer.

BRIEF DESCRIPTION OF THE DRAWINGS

For a clearer understanding, the following figures are attached which provide preferred embodiments and should not be seen as limiting the scope of the present disclosure.

FIG. 2 illustrates results obtained after subjection to several tests by diverse materials.

DETAILED DESCRIPTION

Figure 1:
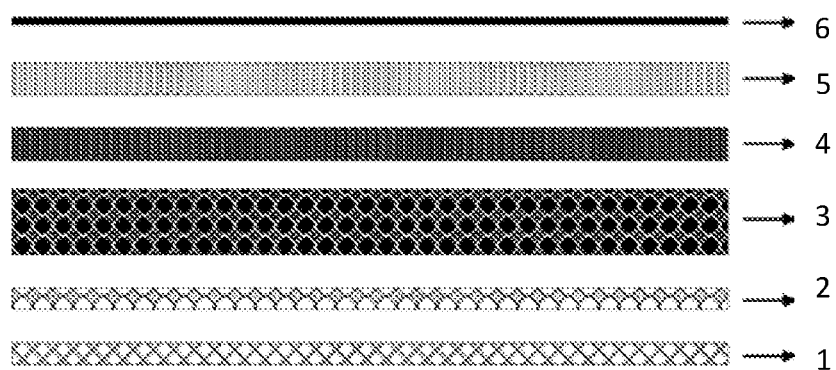
FIG. 1 illustrates an embodiment of the flexible composite material described
wherein 1 represents a textile support layer;
wherein 2 represents a PVC based adhesive foam;
wherein 3 represents a PVC based foam;
wherein 4 represents the compact PVC layer;
wherein 5 represents a TPU compact layer;
wherein 6 represents a coating with lacquer;
wherein the set 1,2,3 represent the PVC intermediate layer.

The present description refers to a flexible composite material, method of obtention and uses thereof with surprising resistance to tear, fissure and/or breaking of material under conditions of extreme use, namely presence of oil and low temperatures.

In an embodiment, the flexible composite material described in the present document comprises a plurality of layers with a variation of their chemical nature and the process used for its obtention. This new material presents a structure of thermoplastic polyurethane (TPU) with polyvinyl chloride (PVC) in sublayers, wherein the TPU layer functions as a barrier layer to the passage of plasticizers, and/or for the entrance of fluids alien to the material, thereby allowing for an increase in the quality of the material and the lifecycle of the product due to the combination of different TPUs.

In an embodiment the production of the flexible composite material may comprise four sequential stages:
- production of a PVC semimanufacture through the coating/enduction of the compact PVC layer+foam+adhesive foam+textile (1st Stage);
- extrusion of the compact TPU layer with simultaneous gluing of the PVC semimanufacture obtained in the previous step, in this way obtaining a PVC/TPU semimanufacture (2nd Stage);
- optionally, perform the lacquer of the PVC+TPU semimanufacture through rotogravure with water-based polymers or solvent (3rd Stage);
- optionally, perform the material obtained in the previous step can still be engraved for application of surface embossing conferring the final intended appearance (4th Stage).

Next, descriptions of possible embodiments in each stage will be described.

In an embodiment of the manufacturing stage of a PVC semimanufacture, several sublayers can be used as, for example, the sublayers exemplified in Table 1.

TABLE 1

Description of a preferential embodiment where the raw products and amounts used per layer of the PVC semimanufacture can be observed.

| Layer | Description | Quantity |
|---|---|---|
| Compact PVC Layer 100 g/m2 | Linear plasticizer | 40 |
| | Polymeric plasticizer | 20 |
| | Stabilizer | 1.8 |
| | Sodium perchlorate | 0.27 |
| | Soybean oil | 2 |
| | PVC | 60 |
| | Pigment | 2.5 |
| Foam 150 g/m2 | Linear plasticizer | 30 |
| | Polymeric plasticizer | 35 |
| | Stabilizer | 2.2 |
| | Co-stabilizers | 0.33 |
| | PVC | 20 |
| | PVC | 40 |
| | Antimony trioxide flame retardant | 2.5 |
| | Azodicarbonamide blowing agent | 3.74 |
| | Pigment | 1.2 |
| Adhesive foam 120 g/m2 | Linear plasticizer | 30 |
| | Polymeric plasticizer | 35 |
| | Stabilizer | 2.23 |
| | Co-stabilizer | 0.34 |
| | PVC | 60 |
| | Antimony trioxide flame retardant | 2 |
| | Azodicarbonamide blowing agent | 3.79 |
| Support Layer | Knitted fabric | |

The layers are produced through enduction process, with PVC (plastisol) fluid paste deposition, prepared beforehand, supported by silicone paper, in a continuous form, as illustrated in FIG. 2.

The recipe in table 1 is a typical recipe of PVC base artificial leather materials, which typically reveal fissures after contact with oils.

In an embodiment, during the second stage, a layer of thermolplastic polyurethane, whose composition and structure were optimized in order to create a barrier effect of the PVC semimanufacture to oils and grease contact (of the human body, of the driver and passengers which can be simulated through VDA 230-225 of the mixture of babassu oil (CAS 91078-92-1), jojoba oil (CAS 61789-91-1), squalene (CAS 111-02-4)) was applied over the PVC Semimanufacture produced in the first stage, preventing fissuring through the extraction of the plasticizer.

A simple/any TPU layer could retard the contact with oils and grease from the human body with the PVC semimanufacture (which causes the fissuring), but not prevent it as these oils migrate through the TPU. The optimization concerning the composition of the TPU compact layer ("TPU compact layer") in sublayers was done taking into account the absorption capacity of different TPUs for the oils and grease typically present in the interior of an automobile. The absorption of oil should be maximum in the aromatic TPU and minimum in the aliphatic TPU. In this way, the migration of oils in the right way to the PVC intermediate layer is minimized. In addition to this, any oil which enters the aromatic layer allows absorption, functioning as a retention layer. In particular, the existence of the aliphatic TPU layer in contact with the PVC in addition to allowing greater adhesion between PVC and TPU, avoids the direct contact with the aromatic TPU, which would absorb some plasticizer from the PVC intermediate layer. The material with greatest absorption capacity is the one which comprises a sublayer of aromatic TPU and another sublayer of aliphatic TPU in contact with the PVC; improving the adhesion to PVC and thereby the performance of the material described (see table 2).

In this way, the creation of sublayers inside the TPU compact layer (through the co-extrusion process) allows for a sublayer of aromatic TPU with high absorption of oils and grease ("TPU-B"), a sublayer of aliphatic TPU adjusted to the right side (which receives UV radiation in the interior of the automobile) which has good resistance to UV and the same recipe on the face of the reverse side as it presents good adhesion to PVC ("TPU-A"): despite not absorbing oils and grease, due to reduced absorption of oils, preventing their contact/existence at the surface of the PVC (fault mechanism). In order to guarantee a greater adhesion between the TPU layer and the PVC semimanufacture, the TPU layer is glued (laminated) to the PVC semimanufacture during the extrusion process, therefore contacting with the PVC while it is in the smelted form. For the adhesion to be thermal and effective, the PVC semimanufacture is also heated by infrared radiation so that it also becomes soft. The temperature the infrared confer to the PVC semimanufacture cannot be excessive as it can degrade. Also for this reason, the surface layer of the PVC semimanufacture is compacted and not foam, because it is more resistant to heating by infrareds and increases the surface of contact with the TPU compact layer (see table 2).

TABLE 2

Description of the raw materials and quantities used per sublayer of PVC semimanifacture

| Layer | Sublayer | Description | Quantity parts per hundred parts of resin (parts per hundred parts of resin-PHR) |
|---|---|---|---|
| TPU compact layer | TPU-A 39.5 (g/m2) | TPU of an aliphatic nature | 100 |
| | | Pigment | 4 |
| | TPU-B 155.0 (g/m2) | TPU of an aromatic nature | 100 |
| | | Pigment | 4 |
| | TPU-A 39.5 (g/m2) | TPU of an aliphatic nature | 100 |
| | | Pigment | 4 |

At the end of this stage, it is possible to obtain part of the material—"PVC+TPU semimanufacture".

The material can still be improved with finishing processes, common in the production of artificial leather, such as lacquer by rotogravure. This process is common in the production of artificial leather.

The material can also be engraved with a predefined pattern, to confer texture for a better aesthetic effect, for example, imitation of the surface of natural leather In another embodiment, the surface layer of the PVC semimanufacture can be compact and not foam, in order to be more resistant to the engraving process.

The present flexible composite material presents low fissuring/tearing (anti-crack) when applied in upholsteries, compared to the state of the art materials, namely PUR with high concentration of solids (High Solids PUR) and PVC.

In this manner, compared with the current state of the art in synthetic PVC based leather, the present disclosure presents greater processing flexibility, the possibility of containing a higher quantity of recyclable material (TPE) and lower migration of PVC constituents, namely its plasticizer, conferring a longer lifecycle to the material, as durability is critical for automobile manufacturers.

The different methods show that flexible composite PVC based upholsteries tend to present fissures and/or deformation under extreme conditions, namely when exposed to low temperatures.

The flexible composite material applied to upholsteries for automobiles presents in both situations of extreme heat/cold good resistance to impact, fatigue and breaking even after 72 h at 40° C. and 10.000 flexural cycles at −20° C. (by the VDA 230-225 method), it is verified that the material presents good resistance to impact and fatigue even after 50.000 cycles (by the VDA 230-225 method). As observed in FIG. 2.

Generically, the VDA 230-225 test applies a mixture of oils (namely babassu oil (CAS 91078-92-1), jojoba oil (CAS 61789-91-1) squalene (CAS 111-02-4)) during 72 h at 40° C. and 10 000 flections at −20° C. over a sample of the material under test, after which the strain and flection of the material are measured.

Throughout the description and claims the word "comprises" and variations of the word do not have the intention of excluding other technical characteristics, additives, components, or steps. Additional objects, advantages and characteristics of the disclosure will become apparent to those skilled in the art after the examination of the description or can be learned through the practice of the invention. The following examples and figures are provided as forms of illustration, and do not have the intention of limiting the scope of the disclosure. Additionally, the present disclosure covers all the possible combinations of particular or preferential embodiments herewithin described.

The disclosed embodiments are combinable.

The disclosure is of course not in any way restricted to the embodiments described and a person with ordinary skill in the art will foresee many possibilities to modifications thereof without departing from the basic disclosure as defined in the appended claims.

The following claims set out particular embodiments of the disclosure.

The invention claimed is:

1. A flexible composite material comprising the following layers:
   a support layer selected from the following list: fabric, knitted fabric, nonwoven fabric, foam, or mixtures thereof;
   an intermediate layer of polyvinyl chloride, PVC, containing a plurality of sublayers;
   a compact layer of thermoplastic polyurethane, TPU, containing a plurality of sublayers;
   wherein the TPU compact layer comprises:
   30-66% w/w of an aromatic TPU;
   15-33% w/w of an aliphatic TPU; and
   an exterior lacquer layer in contact with the TPU compact layer,
   wherein the TPU compact layer comprises sublayers including a first aliphatic TPU layer in contact with the intermediate layer of PVC, an aromatic TPU layer and a second aliphatic TPU layer in contact with the exterior layer of lacquer.

2. The flexible composite material according to claim 1, wherein the TPU compact layer is extruded.

3. The flexible composite material according to claim 1, wherein the PVC intermediate layer is obtainable through coating.

4. The flexible composite material according to claim 1, wherein the first aliphatic TPU layer and the second aliphatic TPU layer each comprises an aliphatic TPU obtained from a polyol and an isocyanate, and wherein the isocyanate is selected from the group consisting of: hexamethylene diisocyanate, isophorone diisocyanate, 2-methylphenthane diisocyanate, 2,4,4-trimethylhexamethylene diisocyanate, norbornane, isophorone diisocyanate; dicyclohexylmethane diisocyanate, meta-tetramethylxylene diisocyanate; 1,4-cyclohexane diisocyanate, and mixtures thereof.

5. The flexible composite material according to claim 1, wherein the aromatic TPU layer comprises an aromatic TPU obtained from at least one of the following compounds: 4,4'-diphenyl methane diisocyanate, diisocyanatemethylbenzene, toluene diisocyanate and its isomers 1.5-naphthalene diisocyanate, p-phenylene diisocyanate, and mixtures thereof.

6. The flexible composite material according to claim 1, wherein the thickness of the PVC intermediate layer is of 50-1000 µm.

7. The flexible composite material according to claim 6, wherein the thickness of the PVC intermediate layer is of 200-650 µm.

8. The flexible composite material according to claim 1, wherein the thickness of the TPU compact layer is of 20-1000 µm.

9. The flexible composite material according to claim 8, wherein the thickness of the TPU compact layer is of 150-500 µm.

10. The flexible composite material according to claim 1, wherein the TPU compact layer comprises between 3-5 sublayers.

11. The flexible composite material according to claim 1 wherein at least one of the TPU compact layer and the PVC intermediate layer further comprises at least one of pigment, additive, stabilizer, filler, plasticiser, blowing agent, and expansion reaction catalyst.

12. The flexible composite material according to claim 1 wherein each of the layers have the following thicknesses:
   the support layer between 300-2000 µm;
   the PVC intermediate layer between 50-1000 µm;
   the TPU compact layer between 20-1000 µm; and
   the exterior lacquer layer between 1-100 µm.

13. The flexible composite material according to claim 12, wherein each of the layers have the following thicknesses:
   the support layer between 400-600 µm;
   the PVC intermediate layer between 200-650 µm;

the TPU compact layer between 50-500 μm; and the exterior lacquer layer between 10-15 μm.

14. An upholstery comprising the flexible composite material as described in claim 1.

15. A seat for automobiles comprising the flexible composite material as described in claim 1.

16. A process for obtaining the flexible composite material according to claim 1 comprising the following steps:

obtaining the PVC intermediate layer through coating or enduction of the PVC intermediate layer and the support layer; and extruding the TPU compact layer and simultaneously gluing the TPU compact layer to the PVC intermediate layer;

wherein the TPU compact layer comprises sublayers including the first aliphatic TPU layer in contact with the intermediate layer of PVC, the aromatic TPU layer and the second aliphatic TPU layer.

* * * * *